United States Patent
Kuwada

(10) Patent No.: US 7,518,323 B2
(45) Date of Patent: Apr. 14, 2009

(54) MOTOR DRIVING DEVICE

(75) Inventor: Katsuji Kuwada, Chita-gun (JP)

(73) Assignee: Denso Corporation, Kariya (JP)

( * ) Notice: Subject to any disclaimer, the term of this patent is extended or adjusted under 35 U.S.C. 154(b) by 121 days.

(21) Appl. No.: 11/589,394

(22) Filed: Oct. 30, 2006

(65) Prior Publication Data

US 2007/0108924 A1    May 17, 2007

(30) Foreign Application Priority Data

Nov. 11, 2005   (JP) .............................. 2005-327256

(51) Int. Cl.
*H02P 5/00* (2006.01)
(52) U.S. Cl. .............................. 318/66; 318/98; 318/77; 318/268
(58) Field of Classification Search .................... 318/66, 318/98, 77, 268, 109, 107, 51, 53; 138/50
See application file for complete search history.

(56) References Cited

U.S. PATENT DOCUMENTS 4,200,828 A * 4/1980 Ridler et al. ................ 318/558
4,511,826 A * 4/1985 Kouchi et al. ................. 318/98

OTHER PUBLICATIONS

Examination Report dated Dec. 7, 2007 in Chinese Application No. 2006 10146305.9 with English translation thereof.

* cited by examiner

*Primary Examiner*—Karen Masih
(74) *Attorney, Agent, or Firm*—Harness, Dickey & Pierce, PLC

(57) ABSTRACT

A motor driving device is disclosed that includes a first drive circuit that drives a first electric motor and increases a rotational speed of the first electric motor according to an increase in a duty ratio of a pulse signal output from an electronic control unit. The motor driving device also includes a second drive circuit that drives a second electric motor and increases the rotational speed of the second electric motor according to the increase in the duty ratio of the pulse signal. The second drive circuit smooths the pulse signal from the electronic control unit to produce a direct-current voltage. Also, the second drive circuit supplies electric power to the second electric motor by applying the direct-current voltage to the second electric motor.

6 Claims, 3 Drawing Sheets

US 7,518,323 B2

MOTOR DRIVING DEVICE

CROSS REFERENCE TO RELATED APPLICATION

This application is based on and incorporates herein by reference Japanese Patent Application No. 2005-327256 filed on Nov. 11, 2005.

FIELD

The present invention relates to a motor driving device that drives a plurality of electric motors.

BACKGROUND

Vehicle air-conditioner systems have been proposed that have a plurality of electric air blowers (e.g., two air blowers) and a motor driving device that drives each of the air blowers together. For instance, a conventional configuration of an electrical circuit for the motor driving device is shown in FIG. 3.

The motor driving device 10 includes inverter circuits 20, 30, an oscillation circuit 31, and field-effect transistors 32, 33. The inverter circuit 20 drives a three-phase brushless motor MO1 for the air blower based on a pulse signal P0, which is outputted from an electronic control unit 40 (ECU).

More specifically, a stator of the three-phase brushless motor MO1 has armature windings A, B, C that provide a rotor with a rotating magnetic field. The inverter circuit 20 increases a rotational speed of the three-phase brushless motor MO1 (i.e., the rotor) by applying a higher voltage to the armature windings A, B, C when the duty ratio of the pulse signal P0 increases. With reference to FIG. 3, the duty ratio is expressed as: TH/TH+TL.

The inverter circuit 30 drives a single-phase brushless motor MO2 for the air blower based on the pulse signal P0 outputted from the ECU 40. More specifically, the inverter circuit 30 outputs a pulse signal P1 to the field-effect transistor 32, and outputs a pulse signal P2 to the field-effect transistor 33.

The pulse signals P1, P2 have the same frequency of f1 and there is a 180° phase shift between these two signals as shown in FIGS. 4A and 4B. The inverter circuit 30 increases the corresponding duty ratio of each of the pulse signals P1, P2 according to an increase in the duty ratio of the pulse signal P0. Additionally, electric motors employed as the brushless motors MO1, MO2 are different from each other due to different volumes of required air to be supplied.

The oscillation circuit 31 outputs a pulse signal P3 that has a constant frequency of f2 (e.g., 20 KHz), which is greater than f1 as shown in FIG. 4C. The pulse signal P3 is output to a corresponding gate terminal of each of the field-effect transistors 32, 33.

Consequently, as shown in FIG. 4D, the field-effect transistor 32 switches on and off at the frequency of f2 during a period H1 based on the pulse signal P3 outputted from the oscillation circuit 31 and the pulse signal P1 from the inverter circuit 30.

As shown in FIG. 4E, the field-effect transistor 33 switches on and off at the frequency of f2 during a period H2 based on the pulse signal P3 outputted from the oscillation circuit 31 and the pulse signal P2 from the inverter circuit 30.

The single-phase brushless motor MO2 is connected to the field-effect transistors 32, 33 and a direct-current power supply Vcc. The stator of the single-phase brushless motor MO2 has armature windings A, B that provide the rotor with the rotating magnetic field.

Accompanying the switching of the field-effect transistor 32, an electric current from the direct-current power supply Vcc passes through the armature winding A. The electric current from the direct-current power supply Vcc passes through the armature winding B following the switching of the field-effect transistor 33.

Because of the 180° phase shift between the pulse signals P1, P2 as described above, the switching of the field-effect transistor 32 alternates with that of the field-effect transistor 33. Accordingly, energization of the armature winding A from the direct-current power supply Vcc alternates with that of the armature winding B.

The oscillation circuit 31 increases the duty ratio of the pulse signal P3 as the duty ratio of the pulse signal P0 outputted from the electronic control unit 40 increases. Furthermore, as mentioned above, the inverter circuit 30 increases the corresponding duty ratio of each of the pulse signals P1, P2 according to the increase in the duty ratio of the pulse signal P0. As a result, as the duty ratio of the pulse signal P0 increases, an average electric current that passes through the armature windings A, B from the direct-current power supply Vcc increases. Thus, the rotational speed of the single-phase brushless motor MO2 increases in proportion to the duty ratio of the pulse signal P0. Consequently, the rotational speeds of the brushless motors MO1, MO2 are controlled by means of the duty ratio of the pulse signal P0 from the electronic control unit 40 so that the brushless motors MO1, MO2 are driven together.

However, conventional systems such as the motor driving device 10 described above have certain problems. For instance, in motor driving device 10 described above, the oscillation circuit 31 that oscillates at the constant frequency of f2 is employed in controlling the rotational speed of the single-phase brushless motor MO2. The oscillation of the oscillation circuit 31 generates undesired radiation, which can adversely affect other devices, such as audio devices (e.g., radio), video devices (e.g., television), and the like.

SUMMARY

A motor driving device is disclosed that includes a first drive circuit that drives a first electric motor and increases a rotational speed of the first electric motor according to an increase in a duty ratio of a pulse signal output from an electronic control unit. The motor driving device also includes a second drive circuit that drives a second electric motor and increases the rotational speed of the second electric motor according to the increase in the duty ratio of the pulse signal. The second drive circuit smooths the pulse signal from the electronic control unit to produce a direct-current voltage. Also, the second drive circuit supplies electric power to the second electric motor by applying the direct-current voltage to the second electric motor.

BRIEF DESCRIPTION OF THE DRAWINGS

Additional features and advantages will be understood from the following description, the appended claims and the accompanying drawings. In the drawings:

DETAILED DESCRIPTION OF THE EMBODIMENT

Figure 1:
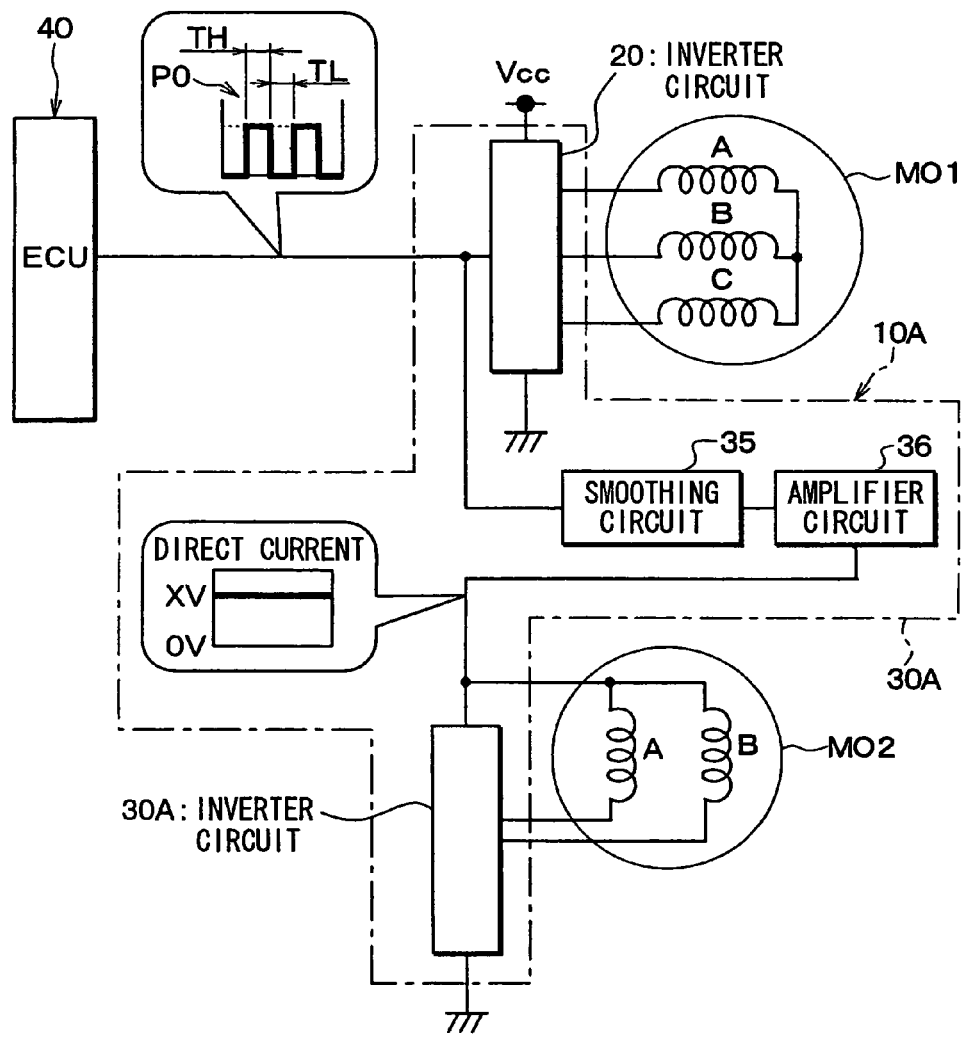
FIG. 1 is a schematic circuit diagram showing an embodiment of a motor driving device.

Referring to FIG. 1, a motor driving device 10A is illustrated. In one embodiment, the motor driving device 10A is used for an air blower in a vehicular air-conditioner. It will be appreciated, however, that the motor driving device 10A could be used for any suitable purpose. In FIG. 1, the same numerals are assigned to corresponding components to those shown in FIG. 3.

The motor driving device 10A includes inverter circuits 20, 30A, a smoothing circuit 35, and an amplifier circuit 36. In one embodiment, the inverter circuit 20 of the present embodiment is widely known (e.g., substantially similar to the inverter circuit 20 shown in FIG. 3).

The smoothing circuit 35 includes a smoothing capacitor and the like, and smooths a pulse signal P0, which is outputted from an electronic control unit 40. The amplifier circuit 36 amplifies a voltage outputted from the smoothing circuit 35 and applies the amplified voltage to a single-phase brushless motor MO2. The brushless motor MO2 is driven by the inverter circuit 30A based on an output voltage from the amplifier circuit 36.

Next, an operation of the motor driving device 10A of the present embodiment will be described.

The electronic control unit 40 outputs the pulse signal P0 to the inverter circuit 20. Consequently, the inverter circuit 20 drives a three-phase brushless motor MO1 based on a duty ratio of the pulse signal P0. More specifically, the inverter circuit 20 increases a rotational speed of the three-phase brushless motor MO1 by increasing voltages to be applied to armature windings A, B, C of the three-phase brushless motor MO1 in accordance with an increase in the duty ratio.

The pulse signal P0 outputted from the electronic control unit 40 is also transmitted to the smoothing circuit 35, which smooths the pulse signal P0. The pulse signal P0 that is smoothed is amplified by the amplifier circuit 36 to a direct-current voltage XV, which is applied to armature windings A, B of the single-phase brushless motor MO2. That is, electric power is supplied to the armature windings A, B of the single-phase brushless motor MO2 by the amplifier circuit 36.

Figure 2A:
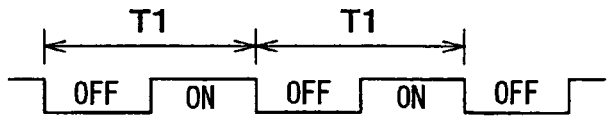
FIGS. 2A and 2B are schematic diagrams illustrating the operation of an inverter of the motor driving device of FIG. 1.

Meanwhile, as shown in FIG. 2A, the inverter circuit 30A switches on and off a connection between the armature winding A and a ground at a substantially constant period of T1. The inverter circuit 30A also switches on and off a connection between the armature winding B and the ground at a substantially constant period of T1 as shown in FIG. 2B.

Figure 2B:

As shown in FIGS. 2A and 2B, the period during which the connection between the armature winding A and the ground is turned on overlaps the period during which the connection between the armature winding B and the ground is turned off. Moreover, the period during which the connection between the armature winding A and the ground is turned off overlaps the period during which the connection between the armature winding B and the ground is turned on.

Accordingly, energization of the armature winding A from the amplifier circuit 36 alternates with that of the armature winding B from the amplifier circuit 36. For this reason, a rotating magnetic field is generated by the armature windings A, B, thereby rotating a rotor. That is, the single-phase brushless motor MO2 is rotated.

Furthermore, according to an increase in the duty ratio of the pulse signal P0 from the electronic control unit 40, an output voltage level from the smoothing circuit 35 rises, and eventually, an output voltage level from the amplifier circuit 36 rises. Hence, as the duty ratio of the pulse signal P0 increases, an electric current that passes through the armature windings A, B strengthens, thereby increasing a rotational speed of the single-phase brushless motor MO2.

Figure 3:
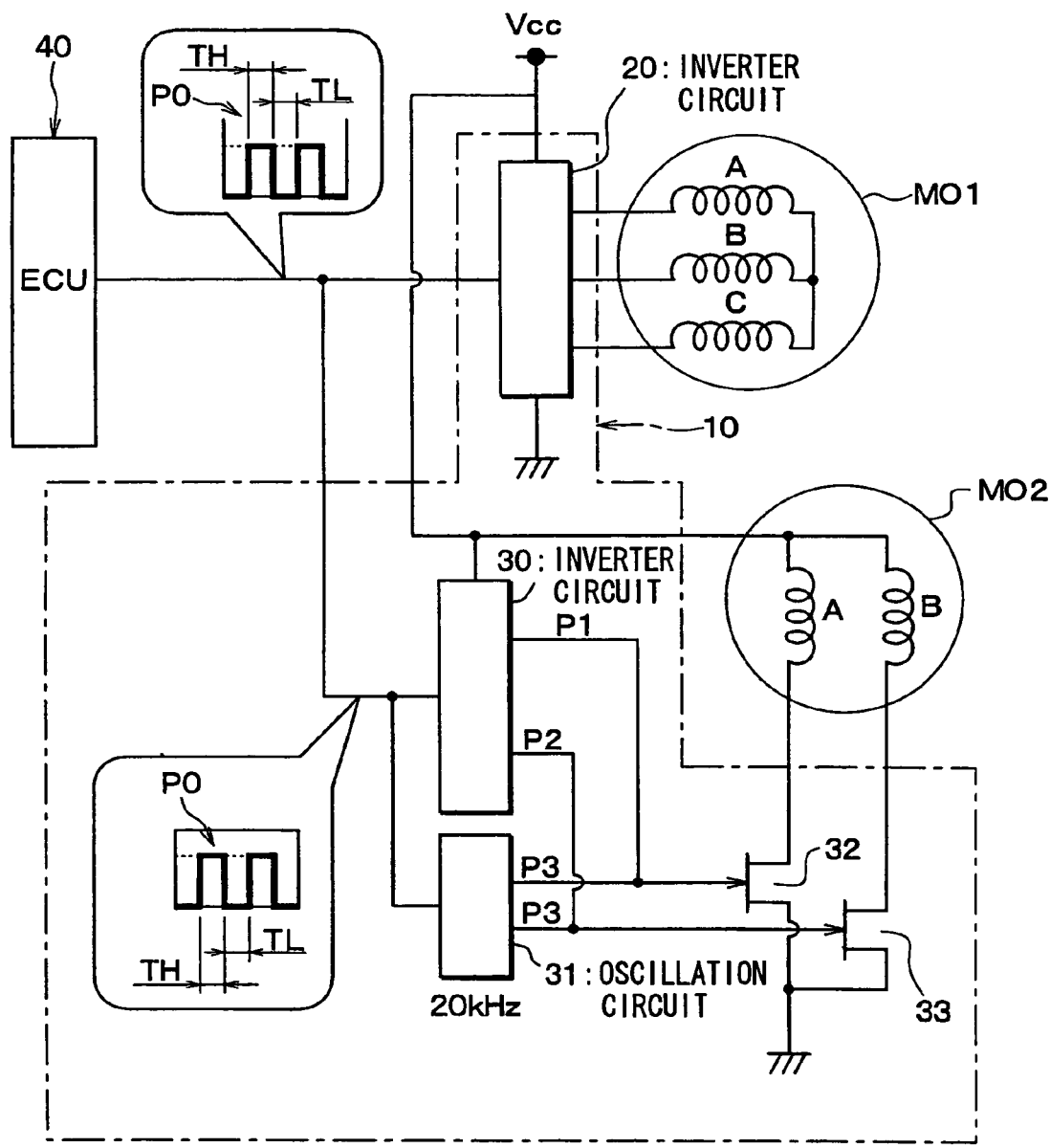
FIG. 3 is a schematic circuit diagram showing a motor driving device of the prior art.
Figure 4A:
FIGS. 4A-4E are schematic diagrams illustrating the operation of an inverter of the motor driving device of FIG. 3.
Figure 4B:
Figure 4C:
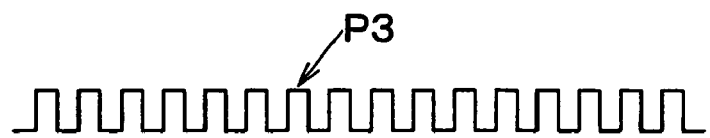
Figure 4D:
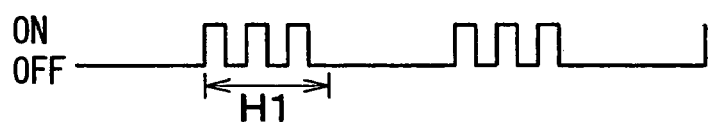
Figure 4E:
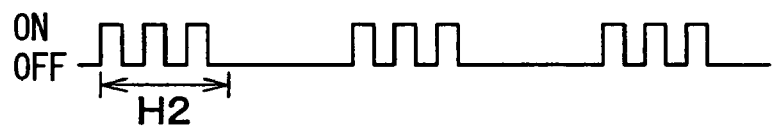

According to the present embodiment as described above, although the motor driving device 10A employs the inverter circuit 30A, the smoothing circuit 35, and the amplifier circuit 36 in controlling the rotational speed of the single-phase brushless motor MO2, an oscillation circuit 31 such as the one illustrated in FIG. 3 is not employed. Therefore, generation of undesired radiation can be reduced.

Also, in the case where the amplifier circuit 36 is not employed between the smoothing circuit 35 and the single-phase brushless motor MO2, the single-phase brushless motor MO2 cannot drive the air blower properly if an output voltage from the smoothing circuit 35 is lower than a predetermined input voltage necessary for driving the air blower by means of the single-phase brushless motor MO2. However, according to the present embodiment, the amplifier circuit 36 is connected between the smoothing circuit 35 and the single-phase brushless motor MO2. Accordingly, the amplifier circuit 36 can amplify the output voltage from the smoothing circuit 35 to the predetermined input voltage, so that the single-phase brushless motor MO2 can properly drive the air blower.

In the above embodiment, in which the single-phase brushless motor MO2 is employed as a second electric motor, has been described. However, without limiting the second motor to the single-phase brushless motor MO2, a DC motor, a three-phase brushless motor or the like may be employed. Furthermore, without limiting the first electric motor to the three-phase brushless motor MO1, the DC motor, a single-phase brushless motor or the like may be employed as the first motor.

Moreover, the rotational speed of the three-phase brushless motor MO1 may be controlled not only through controlling the voltages applied to the armature windings A, B, C of the three-phase brushless motor MO1, but through controlling the duty ratio, a frequency or the like of the voltages applied to the armature windings A, B, C.

In the above embodiment, the motor driving device is applied to a vehicular air-conditioner. Nevertheless, the motor driving device may be applied not only to a vehicular air-conditioner, but to various devices other than a vehicular air-conditioner.

Additionally, in the above embodiment, the duty ratio of the pulse signal P0 outputted from the electronic control unit 40 is expressed as: TH/(TH+TL). However, the duty ratio may be expressed otherwise, such as: TL/(TH+TL).

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A motor driving device comprising:
  a first drive circuit that drives a first electric motor and increases a first rotational speed of the first electric motor according to an increase in a duty ratio of a pulse signal output from an electronic control unit; and a second drive circuit that drives a second electric motor and increases a second rotational speed of the second electric motor according to the increase in the duty ratio of the pulse signal, wherein:

the second drive circuit smooths the pulse signal from the electronic control unit to produce a direct-current voltage for use in the second drive circuit only; and the second drive circuit supplies electric power to the second electric motor by applying the direct-current voltage to the second electric motor.

2. The motor driving device according to claim 1, wherein the second drive circuit further comprises:

a smoothing circuit that smooths the pulse signal; and an amplifier circuit that amplifies an output voltage from the smoothing circuit to apply the output voltage that is amplified to the second electric motor as the direct-current voltage.

3. The motor driving device according to claim 1, wherein:

the second electric motor further comprises a first armature winding and a second armature winding that supply a rotor with a rotating magnetic field;

the second drive circuit applies the direct-current voltage to each of the first and second armature windings; and the second drive circuit further comprises an energization control part that generates the rotating magnetic field from the first and second armature windings by alternating energization of the first and second armature windings.

4. The motor driving device according to claim 1, wherein the second drive circuit further comprises:

a smoothing circuit that smooths the pulse signal;

an amplifier circuit that amplifies an output voltage from the smoothing circuit to apply the output voltage that is amplified to the second electric motor as the direct-current voltage; and an inverter circuit disposed directly between the second electric motor and ground.

5. The motor driving device according to claim 4, wherein the inverter circuit is in electrical communication with the amplifier circuit.

6. The motor driving device according to claim 2, further comprising an inverter circuit, the second drive circuit supplying electric power to the inverter circuit by applying the direct-current voltage to the inverter circuit.

* * * * *